July 26, 1938.  G. A. LYON  2,124,789
WHEEL ORNAMENTAL DISK
Filed Sept. 14, 1933
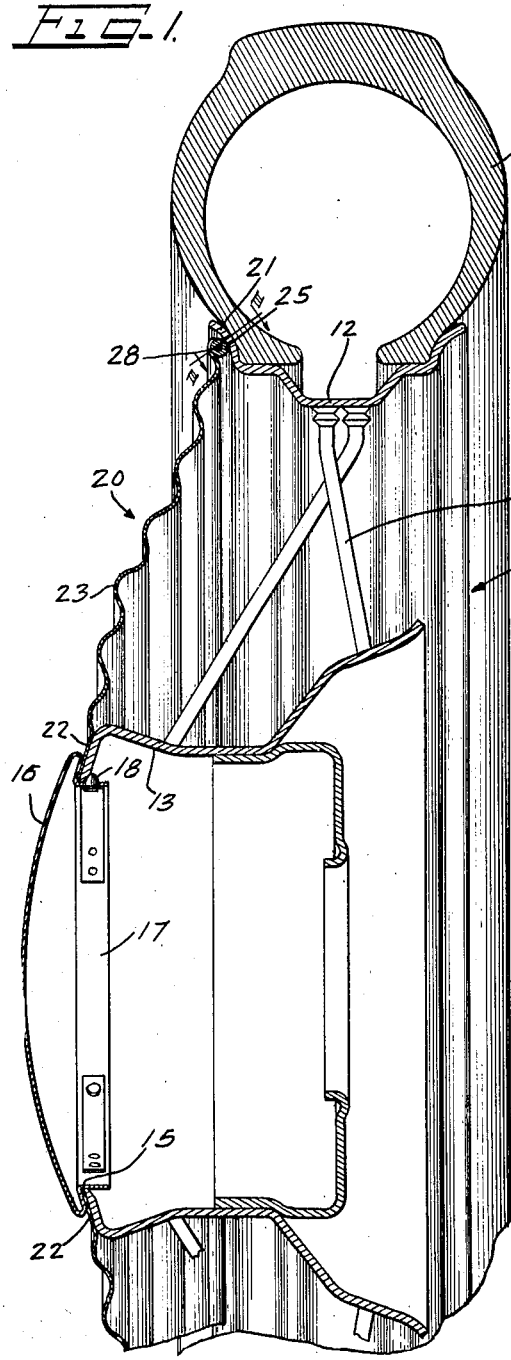
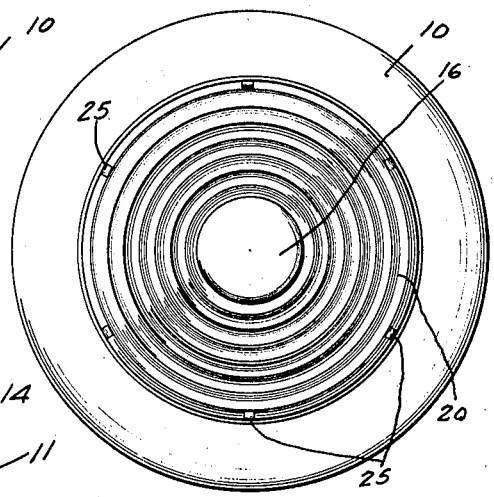
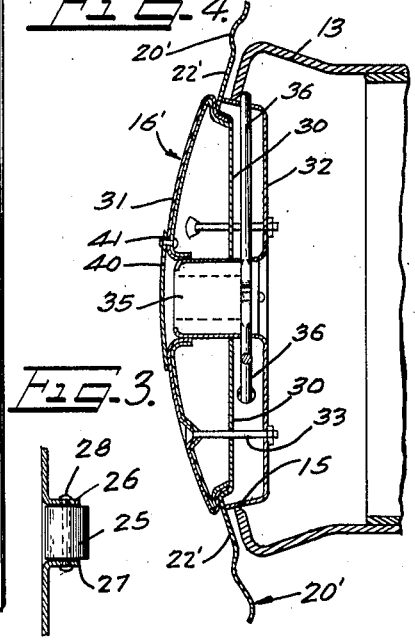
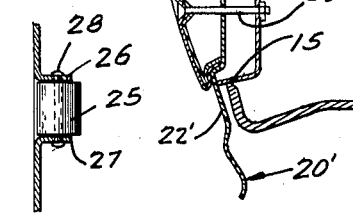
Inventor
GEORGE ALBERT LYON.
by
Attys.

Patented July 26, 1938

2,124,789

UNITED STATES PATENT OFFICE 2,124,789

WHEEL ORNAMENTAL DISK

George Albert Lyon, Detroit, Mich.

Application September 14, 1933, Serial No. 689,378

10 Claims. (Cl. 301—37)

This invention relates to an article of manufacture adapted to be used as an ornamental device for automotive wheels and more particularly to an ornamental disk for an automotive wheel.

An object of this invention is to provide an ornamental device for automotive wheels in the form of a disk which is so formed that it may be secured in place by the hub cap of the wheel without necessitating the use of any special or other fastening means.

Another object of this invention is to provide an ornamental wheel disk of such construction that its appearance is not only enhanced but in addition thereto it is provided with greater rigidity.

In accordance with the general features of this invention, there is provided an ornamental wheel disk for disposition between the tire rim and the hub of a wheel which comprises a plate having a central opening to accommodate a hub cap with the edge of the opening formed to be clamped against the wheel hub by the hub cap and having an outer circular edge portion for yieldable or resilient cooperation with a surface of the tire rim.

In accordance with another feature of the invention this wheel disk or plate is provided with a plurality of circular ridges or corrugations which are offset progressively from the wheel hub toward the tire rim and which are formed to be concentric about the axis of the wheel.

Still another feature of the invention relates to the provision of circumferentially spaced novel resilient elements disposed in the outer margin of the wheel disk for yieldable contact with a surface of the wheel rim.

Other objects and features of this invention will more fully appear from the following detailed description taken in connnection with the accompanying drawing which illustrates several embodiments thereof and in which Figure 1 is a fragmentary sectional view taken through an automotive wheel and tire and through a disk embodying the features of my invention applied to the wheel and held in place by the hub cap.

Figure 2 is a front view of the construction shown in Figure 1 drawn to a reduced scale.

Figure 3 is an enlarged fragmentary view partly in section showing the manner in which the resilient roller-like element is carried by the outer margin of the disk.

Figure 4 is a fragmentary sectional view taken through a modification of the invention in which the center of the disk has secured to it a hub cap provided with locking rods or plungers by means of which the cap may be locked to the wheel hub.

The reference character 10 designates generally a tire which is mounted on a wheel 11 of conventional construction and which includes a tire rim 12 and a central hub 13 connected to the tire rim 12 by means of spokes 14. The wheel hub 13 has a centrally disposed opening 15 into which is adapted to be snapped a conventional hub cap 16. This hub cap 16 includes an inner flange 17 which carries a plurality of spring urged elements 18 adapted to engage the inner surface of the edge of the hub defining the opening 15.

My present invention is concerned with providing a covering disk for the spokes 14 and which disk is adapted to be disposed between the wheel hub 13 and the tire rim 12. This disk is designated generally by the reference character 20. The disk may be made from any suitable sheet material having sufficient rigidity to maintain the shape into which it is formed. I have obtained excellent results by spinning this disk from a disk made from steel sheet. Of course, it is to be understood that this disk may be made in other ways such, for example, as by blanking it from a strip of suitable sheet material.

The disk 20 is of an annular form and is also somewhat conical in shape in that it slants inwardly from the outer side of the wheel hub 13 toward the flange 21 of the tire rim 12.

In the center of the disk 20 there is provided a central opening through which the annular flange 17 of the hub cap 16 is adapted to pass. This opening is defined by an annular flange 22 on the inner edge of the disk, which flange is formed to overlie the outer end of the wheel hub 13 and to be clamped to the wheel hub 13 by means of the hub cap 16.

Outwardly from this annular flange 22 the disk 20 is provided with a plurality of circular corrugations which are designated by the reference character 23. These corrugations or ridges are offset laterally progressively from the wheel hub toward the tire rim and are formed to be concentric about the axis of the wheel. The advantage of these corrugations is that they provide the disk with greater rigidity in addition to greatly enhancing the appearance of the disk. Moreover, when these corrugations are given a proper finish they provide the disk with highlights of such a character that one looking at the disk imagines it is turning. In other words, these concentric circular corrugations or ridges may have such highlights as to cause a person looking at the disk to have an optical illusion.

The outer margin or edge portion of the disk 20 is provided with a plurality of resilient elements which are illustrated as being in the form of circumferentially spaced rubber rollers 25 for contacting the exposed surface of the rim flange 21. Each of these rollers 25, as best shown in Fig. 3 is disposed between offset lugs 26—27 blanked laterally from the material of the disk 20. The roller 25 is carried on a transverse pin 28 extending between and secured to the oppositely disposed lugs 26—27. In Fig. 2 I have illustrated the disk 20 as being provided with six of these circumferentially spaced rollers, but it is of course to be understood that any desired number of these elements may be employed.

The disk 20 is easily applied to the wheel by pressing it into position between the tire rim and the hub. Thereafter, the hub cap 16 is snapped into position in the wheel hub 13. This hub cap 16 not only serves to center the disk 20 on the wheel but also serves to secure it in proper position between the wheel hub 13 and the tire rim 12.

The resilient elements or rollers 25 at the outer margin of the disk provide for a yielding contact between the disk and the tire rim flange 21 and also serve as an anti-rattle means.

In Figure 4 I have illustrated a modification of the invention in which the wheel hub 13 is provided with a locking hub cap 16' instead of a snap-on hub cap 16. This locking hub cap may be of any suitable construction, but is illustrated as embodying the invention disclosed in my co-pending patent application Serial No. 686,031, filed August 21, 1933.

In this form of the invention, the ornamental disk 20' is substantially like the disk 20 with the exception that the central part of the disk is extended from the annular flange 22' into the interior of the hub cap unit 16'. This offset central extension on the disk 20' is designated generally by the reference character 30. Moreover, this inner or offset central portion 30 of disk 20' is secured in place between outer and inner parts 31 and 32 of the hub cap unit 16'. In other words, the hub cap is carried by the disk 20' so that the two are in reality a single unit adapted to be applied to the wheel by the act of inserting the hub cap 31 in the opening 15 of the wheel hub 13. The two disk-like parts 31 and 32 of the hub cap unit 16' are secured together by a plurality of bolts 33 preferably three in number.

Disposed centrally of the hub cap unit 16' is a key operated lock designated generally by the reference character 35. This lock may be of any suitable construction and is adapted to project and retract the locking rods or plungers 36 which also may be three in number. These locking plungers 36 when in a locking position engage the inner surface of the wheel hub 13 as shown in Figure 4. Upon the rotation of the key in the lock cylinder 35, these plungers are retracted out of engagement with the wheel hub 13 so that the hub cap unit 16' together with the integral disk 20' may be removed from the wheel. The details of this lock construction do not per se constitute a part of this invention and are fully disclosed in my aforesaid co-pending patent application.

Normally the lock cylinder 35 is covered by a circular plate 40 pivotally secured by means of a rivet 41 to a portion of the outer part 31 of the hub cap unit 16'. By pivoting this cover plate 40 on the pivot pin or rivet 41 it is possible to expose the key slot in the cylinder 35 so that a key may be inserted therein to operate the locking plunger 36.

In this modification of the invention, the flange 22' of the disk 20' need not engage the outer side of the wheel hub 13. In other words, as soon as the outer edge of the disk 20' yieldably engages the tire rim flange, the key-operated mechanism may be manipulated to project the plungers 36 into locking position.

Now I desire it understood while I have illustrated and described in detail several embodiments of this invention, the invention is not to be thus limited but only insofar as defined by the scope and spirit of the appended claims.

I claim as my invention:

1. As an article of manufacture, an ornamental wheel disk for disposition between the tire rim and the hub of a wheel comprising a plate having a central opening to accommodate a hub cap with the edge of the opening formed to be clamped against a wheel hub by the hub cap and having an outer circular edge for yieldable cooperation with a surface of the tire rim, said plate having a plurality of circular corrugations to provide it with greater rigidity, and resilient means carried by the outer edge portion of said plate for contacting said surface of the tire rim, and comprising a plurality of circumferentially spaced roller-like elements.

2. As an article of manufacture, an ornamental wheel disk for disposition between the tire rim and the hub of a wheel comprising a plate having a central opening to accommodate a hub cap with the edge of the opening formed to be clamped against a wheel hub by the hub cap and having an outer circular edge for yieldable cooperation with a surface of the tire rim, said plate having a plurality of circular corrugations to provide it with greater rigidity, and resilient means carried by the outer edge portion of said plate for contacting said surface of the tire rim, and comprising a plurality of circumferentially spaced roller-like elements each of which elements is disposed between offset lugs blanked laterally from said plate.

3. As an article of manufacture, an ornamental wheel disk for disposition between the tire rim and the hub of a wheel comprising a plate having a central opening to accommodate a hub cap with the edge of the opening formed to be clamped against a wheel hub by the hub cap and having an outer circular edge for yieldable cooperation with a surface of the tire rim, said plate having a plurality of circular corrugations to provide it with greater rigidity, and resilient means carried by the outer edge portion of said plate for contacting said surface of the tire rim, and comprising a plurality of circumferentially spaced roller-like elements each of which elements is disposed between offset lugs blanked laterally from said plate, and carried on a transverse pin secured to said lugs.

4. As an article of manufacture, an ornamental wheel disk for disposition between the rim and the hub of a wheel comprising a plate formed at its center to be secured to the wheel hub and slanting inwardly from the wheel hub toward the rim, said plate having a plurality of circular ridges to provide it with greater rigidity, and resilent means carried by the outer margin of said plate for contacting a surface of the tire rim and comprising a plurality of circumferentially spaced rubber roller-like elements.

5. As an article of manufacture, an ornamental wheel disk for disposition between the rim and the hub of a wheel comprising a plate formed at its center to be secured to the wheel hub and slanting inwardly from the wheel hub toward the rim, said plate having a plurality of circular ridges to provide it with greater rigidity, and resilient means carried by the outer margin of said plate for contacting a surface of the tire rim and comprising a plurality of circumferentially spaced rubber roller-like elements each of which elements is disposed between offset lugs on the plate.

6. As an article of manufacture, an ornamental wheel disk for disposition between the rim and the hub of a wheel comprising a plate formed at its center to be secured to the wheel hub and slanting inwardly from the wheel hub toward the rim, said plate having a plurality of circular ridges to provide it with greater rigidity, and resilient means carried by the outer margin of said plate for contacting a surface of the tire rim and comprising a plurality of circumferentially spaced rubber roller-like elements each of which elements is disposed between offset lugs on the plate and carried on a transverse pin secured to said lugs.

7. In a combination wheel cover and lock structure including a tire and wheel adapted to be centrally supported on a support, a central disk for disposition over the outer side of the wheel, means for locking the disk centrally of the wheel accessible through a central aperture in said disk, and a closure cap carried by said disk over said aperture for concealing said locking means.

8. In a combination wheel cover and lock structure including a tire and wheel adapted to be centrally supported on a support, a central disk for disposition over the outer side of the wheel, means for locking the disk centrally of the wheel accessible through a central aperture in said disk, and a closure cap carried by said disk over said aperture for concealing said locking means, said disk being of such size as to conceal and render inaccessible the wheel securing means for the disk and locked centrally of the wheel.

9. In a combination wheel cover and lock structure including a tire and wheel adapted to be centrally supported on a support, a central disk for disposition over the outer side of the wheel, means for locking the disk centrally of the wheel accessible through a central aperture in said disk, and a closure cap carried by said disk over said aperture for concealing said locking means, said disk having a portion extending transversely inwardly of the wheel with said locking means connected directly to the rear of said central aperture.

10. In a combination wheel cover and lock structure including a tire and wheel adapted to be centrally supported on a support, a central disk for disposition over the outer side of the wheel, means for locking the disk centrally of the wheel accessible through a central aperture in said disk, and a closure cap carried by said disk over said aperture for concealing said locking means, said disk having a portion extending transversely inwardly of the wheel with said locking means connected directly to the rear of said central aperture, said locking means being key operable and being accessible only after said closure cap has been removed from said aperture.

GEORGE ALBERT LYON.